United States Patent [19]

Sugino et al.

[11] Patent Number: 5,652,394

[45] Date of Patent: Jul. 29, 1997

[54] STRESS SENSOR FABRICATED FROM A MATERIAL HAVING PRECIPITATED GRANULAR CARBIDES

[75] Inventors: Kazuo Sugino, Fukuoka; Hiroaki Sakamoto; Toru Inaguma, both of Kawasaki, all of Japan

[73] Assignee: Nippon Steel Corporation, Tokyo, Japan

[21] Appl. No.: 557,087

[22] PCT Filed: Apr. 7, 1995

[86] PCT No.: PCT/JP95/00696

§ 371 Date: Nov. 30, 1995

§ 102(e) Date: Nov. 30, 1995

[87] PCT Pub. No.: WO95/27889

PCT Pub. Date: Oct. 19, 1995

[30] Foreign Application Priority Data

Apr. 8, 1994 [JP] Japan ................................. 6-070366
Oct. 3, 1994 [JP] Japan ................................. 6-238695

[51] Int. Cl.⁶ ............................................... G01B 7/16
[52] U.S. Cl. ................................................. 73/779; 73/774
[58] Field of Search ............................. 73/760, 774, 779

[56] References Cited

U.S. PATENT DOCUMENTS

| | | | |
|---|---|---|---|
| 4,395,719 | 7/1983 | Asahi et al. | |
| 4,408,160 | 10/1983 | King et al. | 73/779 |
| 4,595,150 | 6/1986 | Kuhr | |
| 4,634,976 | 1/1987 | Tiitto | |
| 4,931,730 | 6/1990 | Olsen et al. | 73/779 |
| 5,047,717 | 9/1991 | Hofer | 73/779 |
| 5,166,613 | 11/1992 | Perry | 73/779 |
| 5,195,377 | 3/1993 | Garshelis | 73/779 |

FOREIGN PATENT DOCUMENTS

| | | |
|---|---|---|
| 56-18765 | 2/1981 | Japan . |
| 59-112257 | 6/1984 | Japan . |
| 60-57247 | 4/1985 | Japan . |
| 61-31823 | 7/1986 | Japan . |
| 61-258161 | 11/1986 | Japan . |
| 62-229038 | 10/1987 | Japan . |
| 63-252487 | 10/1988 | Japan . |
| 3-265104 | 11/1991 | Japan . |
| 4-26752 | 1/1992 | Japan . |
| 4-45245 | 2/1992 | Japan . |
| 4-72042 | 3/1992 | Japan . |

*Primary Examiner*—George M. Dombroske
*Assistant Examiner*—Max H. Noori
*Attorney, Agent, or Firm*—Kenyon & Kenyon

[57] ABSTRACT

A stress sensor, which, in use, is attached to a measuring object and generates Barkhausen signals, for measuring a stress applied to the object, wherein the Barkhausen signals have a reduced temperature dependence. The stress sensor is characterized by comprising a steel material having such a texture that a granular carbide comprising: element M wherein M represents at least one element selected from Fe, Al, B, Co, Cr, Mn, Mo, Nb, Ni, Si, Sn, Ti, U, V, W, and Zr; and C has been precipitated in the interior of ferrite grains. Preferably, the average grain diameter of the granular carbide precipitated in the texture is 0.05 to 1.0 μm, and the standard deviation in grain size distribution of the granular carbide is 0.14 to 2.0 μm. In another preferred embodiment, the average grain diameter of the granular carbide is more than 1.0 μm and 3.0 μm or less. Still preferably, the carbide is an $M_3C$ compound.

13 Claims, 4 Drawing Sheets

STRESS SENSOR FABRICATED FROM A MATERIAL HAVING PRECIPITATED GRANULAR CARBIDES

TECHNICAL FIELD

The present invention relates to a stress sensor which, in use, is attached to an object to nondestructively measure, in the field, a stress applied to the object, using a magnetic technique.

BACKGROUND ART

For structural materials constituting buildings, rails, bridges and the like, compression or tensile stress is locally applied by wind force, temperature change, the weight of the material or the like. When the stress exceeds a critical value, failure or distortion of the structural materials occurs, often leading to disasters that might cause loss of life, such as destruction of buildings or derailment of trains. For this reason, structural designs and execution have been carried out in consideration of changes in natural environment. In addition, an attempt was made to measure the stress applied to structural materials and control the results, thereby ensuring safety. This method has been partly put into practical use.

The development of a method for magnetically measuring stress applied to structural materials has hitherto been made in the art. In the magnetic measuring method, a magnetic head comprising an exciting head and a detecting head is used to detect magnetic signals, which reflect the magnetic properties of a measured object, to detect a change in the magnetic signals caused by the application of a stress, thereby measuring the stress applied to the object.

Specific examples of prior art techniques for measuring stress include a non-contact stress measuring device, described in Japanese Examined Patent Publication (Kokoku) No. 52-14986, which utilizes such a phenomenon that the coercive force of the measured object varies depending upon the stress. Further, in order to measure the distribution and change of magnetic anisotropy of a measured object using a cross-sensor, Japanese Examined Patent Publication (Kokoku) No. 61-31828 proposes a method for measuring a magnetic anisotropy pattern.

In recent years, attention has been directed to a method using Barkhausen signals attributable to magnetization discontinuities. When a ferromagnetic material is excited, the movement of domain walls within the ferromagnetic material leads to changes in magnetization. The movement of the magnetic walls is discontinuous in a region where precipitates, grain boundaries, and strain are present. Pulsed voltage signals, having a relatively high frequency, corresponding to the discontinuous change are induced in a detecting coil. The pulsed voltage signals are called "Barkhausen signals," which can be applied to the measurement of stress because the intensity of the signal varies depending upon the stress. Regarding this, the following methods and apparatuses have been disclosed. For example, a non-destructive testing method and apparatus for ferromagnetic materials, described in Japanese Unexamined Patent Publication (Kokai) No. 59-112257, can be mentioned as one specific application example of Barkhausen signals. This proposal demonstrates that the stress can be measured with higher accuracy by detecting Barkhausen signals by taking advantage of electromagnetic induction of a detecting coil in a conventional manner and, in addition, detecting Barkhausen signals contained in a simultaneously generated elastic wave by means of a sensor such as a piezoelectric element. Further, Japanese Unexamined Patent Publication (Kokai) No. 60-57247 describes a sensor, for a stress and defect detecting device, characterized by rounding the front end of a ferrite core of a magnetic head. This sensor has been proposed as a magnetic head, which enables stress to be easily measured, because it can detect signals independently of the geometry of the measured object.

The magnetic measuring method had a problem that the measured object is limited to ferromagnetic materials. In this connection, a method has been proposed wherein a ferromagnetic sensor is attached to the surface of a non-magnetic material, thereby enabling, also in the non-magnetic material, the stress to be measured by the magnetic method. Japanese Unexamined Patent Publication (Kokai) No. 61-258161 describes a non-contact magnetic stress and temperature detector. In this detector, two magnetic layers are bonded to the surface of a non-ferromagnetic object to determine a difference in generation time of large Barkhausen signals between the two magnetic layers, and the stress or temperature is measured based on the difference in generation time.

In order to measure the stress with high accuracy using a magnetic measuring method, other factors influencing the magnetic signals than the stress should be separated. Since ferromagnetic materials have a Curie temperature, the magnetic susceptibility, magnetic permeability, coercive force, and magnetic properties of the Barkhausen signals are likely to be influenced by the temperature. For this reason, in order to measure the stress with high accuracy, correction should be made by subtracting the component influenced by the temperature from the magnetic signals, thereby eliminating the influence of the temperature. In the prior art, the stress value has been determined by measuring the temperature of a measured object and correcting the magnetic signals based on the temperature. Since, however, the temperature dependence of the magnetic signals varies for each measuring object and the temperature dependence of the magnetic signals is not always linear, an enormous amount of data for the calibration curves is necessary for correction. Further, the measurement and analysis take a long time, making it difficult to rapidly measure the stress.

When the stress is measured by attaching, as a stress sensor, an element capable of generating Barkhausen signals to a measured object, connecting an exciting head and a detecting head to the stress sensor and measuring the stress based on Barkhausen signals from the detecting head, the Barkhausen signals are influenced by the temperature if the conventional stress sensor is used for the measurement. For this reason, the prior art technique had a problem that an enormous amount of data for calibration with respect to temperature change should be prepared and this resulted in an increased measuring time.

DISCLOSURE OF INVENTION

An object of the present invention is to provide a stress sensor which, in use, is attached to a measured structure and generates Barkhausen signals for measuring a stress created in the structure, the Barkhausen signals detected being substantially uninfluenced by temperatures so far as they fall within the service temperature range.

The stress sensor according to the present invention, which, in use, is attached to a measured object and generates Barkhausen signals, for measuring a stress created in the object, is characterized in that the stress sensor is formed of a steel material having such a texture that a granular carbide comprising: element M, wherein M represents at least one element selected from Fe, Al, B, Co, Cr, Mn, Mo, Nb, Ni, Si, Sn, Ti, U, V, W, and Zr; C; and unavoidable impurities has been precipitated in the interior of ferrite grains.

Preferably, the granular carbide precipitated in the texture has an average grain diameter of 0.05 to 1.0 µm and a standard deviation in grain size distribution of 0.14 to 2.0 µm. In another preferred embodiment, the average grain diameter of the granular carbide is more than 1.0 µm and 3.0 µm or less.

Further, the present invention is characterized in that the precipitated carbide is at least one compound selected from $MC_2$, $MC$, $M_2C$, $M_7C_3$, $M_3C$, $M_{23}C_6$, and $M_6C$ compounds. In particular, when the carbide is an $M_3C$ compound, a stress sensor having excellent properties can be provided.

BEST MODE FOR CARRYING OUT THE INVENTION

Figure 1:
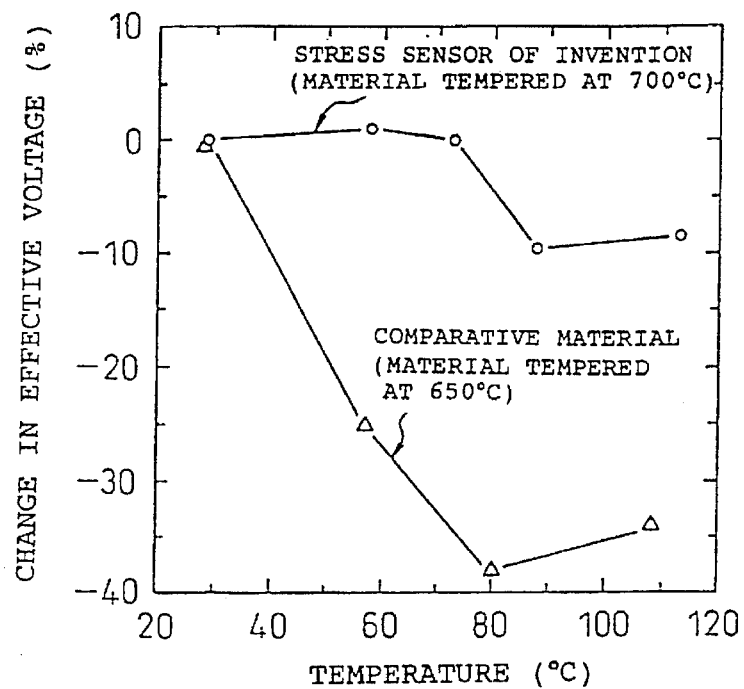
FIG. 1 is a graph showing the temperature dependence of Barkhausen signals in a stress sensor according to one embodiment of the present invention, in comparison with that for a comparative material.

The stress sensor of the present invention, in use, is attached to a structure as a stressed object and enables the stress to be measured in a dynamic measuring range of –30 to 30 kg/mm² substantially independently of the temperature. The stress sensor is preferably in a sheet or plate form, and, for example, the thickness thereof is suitably in the range of from about 0.05 mm to several cm. The stress sensor may be attached to the structure either by bonding with an adhesive or by welding using an arc discharge or the like. When the stress sensor is attached to the structure by welding, the texture of the weld is changed. Therefore, the size of the stress sensor should be larger, by the size of a heat-affected zone, than that of a magnetic head used for detecting signals.

The method of detecting Barkhausen signals generated from the stress sensor attached to a structure to determine a stress created in the structure will now be described. In summary, at the outset, a magnetic field is applied to the stress sensor by means of an exciting coil using electrical sheet or ferrite as a core, and Barkhausen signals generated by the stress sensor are detected by a detecting head formed of a permalloy or an air-core detecting coil. The Barkhausen signals are obtained by attaching the exciting coil to the stress sensor or structure, conducting AC excitation at an exciting frequency of several Hz to several tens of kHz, and collecting, by means of a band-pass filter, signal components of predetermined frequencies from magnetic signals induced in the detecting coil attached to the stress sensor. Then, the stress created in the structure is determined from the Barkhausen signal strength by using a previously prepared calibration curve. The reason why Barkhausen signals are used as the magnetic signals is that the stress can be measured with a good efficiency and a high accuracy. For example, in the measurement of the stress, Barkhausen signal components ranging from several hundred Hz to several hundred kHz are utilized when the exciting frequency is several Hz.

One feature of the stress sensor of the present invention is that the stress of a structural material can be measured substantially independently of the temperature even when a magnetic technique is used. By virtue of this feature, unlike the prior art, there is no need to prepare a large data base on temperature dependence, and the stress can be measured in a short time, enabling efficient diagnosis of the stress.

The reasons for the limitation on the texture of the stress sensor according to the present invention will now be described. The stress sensor of the present invention is formed of a steel material having such a texture that a granular carbide has been precipitated in the interior of ferrite grains. Ferrite is a term for a phase of α iron or a phase of α iron with other element(s) dissolved therein in a solid solution form. The stress sensor of the present invention embraces those wherein the α iron contains Al, B, C, Co, Cr, Cu, Mn, Mo, Nb, Ni, Si, Sn, Ti, V, W, or Zr dissolved therein in a solid solution form. Further, the stress sensor of the present invention can be provided also when, in addition to the carbide specified in the present invention, other precipitates, for example, AlN and MnS, are present within the ferrite structure.

The granular carbide comprises: element M wherein M represents at least one element selected from Fe, Al, B, Co, Cr, Mn, Mo, Nb, Ni, Si, Sn, Ti, U, V, W, and Zr; C; and unavoidable impurities. Preferably, the saturation magnetization of the carbide precipitated in the interior of ferrite grains is lower than that of ferrite as the matrix phase, and specific examples of the carbide include $MC_2$, $MC$, $M_2C$, $M_7C_3$, $M_3C$, $M_{23}C_6$, and $M_6C$ compounds.

When the carbide is an $M_3C$ compound, the grain diameter and grain size distribution of the carbide can be easily regulated, enabling stress sensors having excellent temperature characteristics to be easily provided. A representative $M_3C$ compound is cementite, a compound wherein M is Fe.

The carbide is in a granular form and preferably precipitated in the interior of ferrite grains from the viewpoint of sensitivity to stress. For example, when cementite having a structure like a pearlite structure is in a sheet form, the stress dependency of Barkhausen signals is so small that the carbide cannot be applied to stress sensors. Further, when the granular carbide is precipitated only in ferrite grain boundaries, a change in Barkhausen signals is unfavorably saturated by a stress as small as about 1 to 3 kg/mm², making it impossible to ensure a measuring dynamic range suitable for practical use.

It has been found that excellent temperature characteristics, that is, excellent stability of detection signals against a temperature change, which is a feature of the present invention, can be achieved by limiting the diameter of the carbide grains to the following diameter range. Specifically, in the case of a granular carbide having an average grain diameter of 0.05 to 1.0 µm, a stress sensor having excellent temperature characteristics can be provided when the standard deviation of the grain size distribution is 0.14 to 2.0 µm, while in the case of a granular carbide having an average grain diameter of more than 1.0 µm and 3.0 µm or less, a stress sensor having excellent temperature characteristics can be provided without expressly limiting the grain size distribution. An average grain diameter of less than 0.05 μm or more than 3.0 μm is unfavorable from the practical point of view because the Barkhausen signal strength is lowered.

The grain size distribution will now be described in more detail. As a result of experiments conducted with varied average grain diameter and grain size distribution, the present inventors have found that a change in Barkhausen signal due to a change in temperature depends upon the grain size distribution of the carbide. Based on this finding, they have specified the average grain diameter and the grain size distribution which can make the Barkhausen signal independent of the temperature.

Specifically, in the case of an average grain diameter of 0.05 to 1.0 μm, the Barkhausen signal is not influenced by the temperature when the grain size distribution in terms of the standard deviation is 0.14 to 2.0 μm. When the standard deviation is less than 0.14 μm, the diameters of the carbide grains are excessively even, so that the Barkhausen signal is likely to be influenced by the temperature. On the other hand, when the standard deviation of the grain size distribution exceeds 2.0 μm, the grain size distribution is not even, so that, here again, the Barkhausen signal is likely to be influenced by the temperature. For this reason, in the case of an average grain diameter of 0.05 to 1.0 μm, the standard deviation is limited to 0.14 to 2.0 μm.

On the other hand, when the average grain diameter of the granular carbide is more than 1.0 to 3.0 μm, it is possible to provide, independently of the grain size distribution, a stress sensor which is substantially independent of the temperature. The reason for this is as follows. The Barkhausen signals generated from the stress sensor is held mainly in the granular carbide precipitated by a magnetic domain wall during excitation, rendering the change in magnetization discontinuous. The Barkhausen signal strength is determined by the pinning power of the carbide. This is because when the average grain diameter is more than 1.0 μm and 3.0 μm or less, the pinning power of the magnetic domain wall becomes less likely to be influenced by the temperature.

The following method may be used as means for precipitating the granular carbide in the interior of ferrite grains. Specifically, in the case of cementite, a carbide of $Fe_3C$, a carbon steel product is maintained in a temperature region, where a γ phase is present, quenched in water, and subsequently tempered in a lower temperature region than that where the γ phase is present. In order to provide a grain size distribution falling within the scope of the present invention, the tempering temperature is preferably 650° C. or above, and in particular, tempering at a temperature just below the temperature region where the γ phase is present can provide the grain size distribution falling within the scope of the present invention in a short time. On the other hand, the stress sensor of the present invention can be provided without quenching by heating-cooling cycles of about ±20° C. of the $A_1$ point temperature.

Regarding the constituents of the stress sensor of the present invention, the C content of the steel is limited to 0.05 to 2.0% by weight. The sensitivity of the stress sensor to the stress increases with decreasing the C content. However, when the C content is less than 0.05% by weight, the number of granular carbides precipitated becomes small. For this reason, in such a material, although the sensitivity to the stress is high, the change in Barkhausen signal is saturated by the application of a stress of 1 to 3 $kg/mm^2$, making it difficult to ensure a measuring dynamic range suitable for practical use. On the other hand, when the C content exceeds 2.0% by weight, the resistance to fatigue caused under cyclic stress conditions is lowered and, at the same time, the weldability of the stress sensor to an object to be measured (a structure) is deteriorated. For this reason, the C content is limited to not more than 2.0% by weight. Preferably, the C content of the steel is 0.1 to 1.2% by weight. When the C content is less than 0.1% by weight, a measuring dynamic range of about 30 $kg/mm^2$ cannot be ensured. For this reason, the lower limit of the C content is not less than 0.1% by weight from the practical point of view. In order to ensure higher fatigue properties and weldability, the upper limit of the C content is preferably 1.2% by weight.

The stress sensor is usable in the temperature range of from −10° to 100° C., and a variation in Barkhausen signal by the temperature is not more than 10%. This temperature range embraces the range of temperatures to which usual structures are exposed. Therefore, the stress sensor is satisfactory for practical use.

EXAMPLE 1

Two thin sheets of 45 mm×20 mm×2 mm were taken from a carbon steel product (containing Mn and Cr) having a C content of 0.7% by weight. They were annealed for one hr in Ar gas at 900° C. falling within a temperature region where the γ phase is present, and then quenched by water cooling. Subsequently, the steel sheets were tempered respectively at 650° C. and 700° C., temperatures below the temperature region where the γ phase is present, each for 3 hr and cooled at rate of 10° C./min. The structure of these samples was observed under a scanning electron microscope. They had such a texture that granular cementite was precipitated in the interior of ferrite grains. The average grain diameter and the standard deviation of the grain size distribution of the granular cementite were determined, and the results thereof are given in Table 1.

TABLE 1

| Tempering temp. | Average grain diameter of cementite | Standard deviation | Remarks |
| --- | --- | --- | --- |
| 650° C. | 0.25 μm | 0.12 μm | Comp. Ex. |
| 700° C. | 0.30 μm | 0.19 μm | Ex. of inv. |

For the sample temperature at 650° C., as can be seen from the standard deviation given in Table 1, granular cementites having relatively even grain sizes were observed in the interior of ferrite grains. This material tempered at 650° C. is outside the scope of the present invention. For the sample tempered at 700° C., the standard deviation of the grain diameter of the precipitated cementite was 0.14 to 2.0 μm, and this sample falls within the scope of the present invention. Barkhausen signals were detected from the tempered materials to determine the temperature dependence of Barkhausen signals.

A U-shaped laminate of silicon steel sheets was used as a exciting head core. Excitation was carried out by allowing a sinusoidal current having a frequency of 2.5 Hz to flow through a coil wound around the exciting head. An air-core coil formed of a fine wire of enamel wound around an acrylic core material was used as a detecting coil. The air-core coil was provided between the two leg portions of the exciting head with the detecting face becoming parallel to the measuring face (flat face of the stress sensor). Voltage signals induced in the detecting coil were amplified by means of a voltage amplifier, and Barkhausen signals having frequencies ranging from 1 to 5 kHz were detected in a frequency filter circuit. A digital oscilloscope was used for the waveform analysis of Barkhausen signals.

The temperature dependence of effective voltage of Barkhausen signal obtained from the material tempered at 650° C. (a comparative example) and the stress sensor of the present invention tempered at 700° C. are shown in FIG. 1. The temperature was raised from room temperature to about 120° C. For the material tempered at 650° C., the effective voltage rapidly decreased with raising the temperature. By contrast, for the stress sensor of the present invention, substantially no change in effective voltage was observed at temperatures up to about 70° C., and the effective voltage was lowered by only about 9% when the temperature exceeded 80° C.

As is apparent from the above results, the use of the stress sensor of the present invention has enabled the stress applied to a measured object to be accurately measured substantially independently of the measuring temperature.

EXAMPLE 2

A stress sensor was attached to a steel product and the product was compressed by means of a compression tester. In this state, Barkhausen signals were measured, and the relationship between the Barkhausen signals and the compression stress was determined. In this case, the material under test and the temperature were varied to determine the influence thereof.

Three thin sheets of 45 mm×20 mm×2 mm were taken from a carbon steel product having a C content of 0.7% by weight. Among them, two sheets were annealed for one hr in Ar gas at 900° C., a temperature falling within a temperature region where the γ phase is present, and then quenched by water cooling. Subsequently, the steel sheets were tempered respectively at 500° C. and 700° C., temperatures below the temperature region where the γ phase is present, each for 3 hr and cooled at rate of 10° C./min. The remaining one sheet was annealed in Ar at 900° C. for one hr and then cooled at a rate of 10° C./min. The texture of these samples was observed. The results are given in Table 2.

TABLE 2

| No. | Tempering temp. | Average grain diameter of cementite | Standard deviation | Remarks |
| --- | --- | --- | --- | --- |
| 1 | 700° C. | 0.78 μm | 0.44 μm | Ex. of inv. |
| 2 | 500° C. | 0.39 μm | 0.11 μm | Comp. Ex. |
| 3 | Gradually cooled from 900° C. | Plate cementite | — | Comp. Ex. |

The sample tempered at a temperature of 700° C. had a texture falling within the scope of the present invention as demonstrated in Example 1. For the sample tempered at a temperature of 500° C., granular cementites having even grain sizes were observed in the interior of ferrite grains, and the standard deviation was less than 0.14 μm. Therefore, this sample is outside the scope of the present invention. For the sample which had been gradually cooled from 900° C., a pearlite structure was observed wherein plate cementites were precipitated in a lamellar form.

Each sheet sample was welded to a square steel product of 100 mm×100 mm×300 mm by an arc discharge welding process. In this case, the sample was welded to the side of the steel product so that the longitudinal direction of the sample conformed to that of the steel product. Compression stress was applied to the longitudinal direction of the steel product. In this case, the steel product was heated by a heater, and the temperature of the steel product was varied to determine the correlation between the Barkhausen signal and the stress. A magnetic head and a signal analyzing system used were the same as those of Example 1, and Barkhausen signals having frequencies ranging from 1 to 5 kHz were detected. In this case, the direction of excitation was allowed to conform to that of stress.

Figure 2:
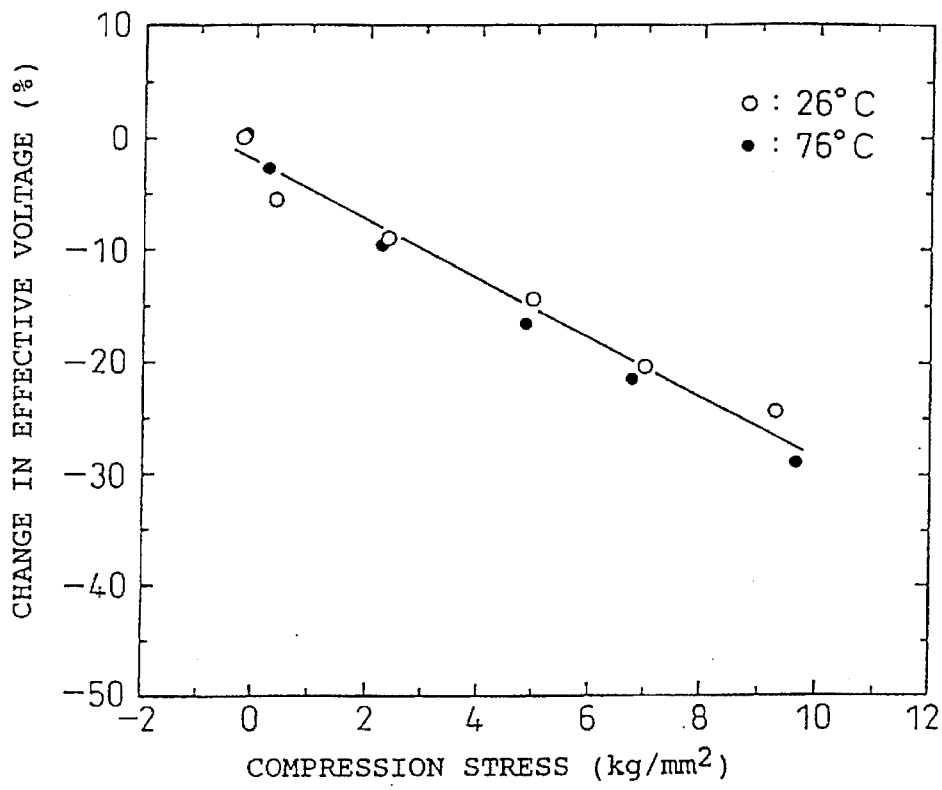
FIG. 2 is a graph showing the compression stress dependence of Barkhausen signals in a stress sensor according to one embodiment of the present invention.
Figure 3:
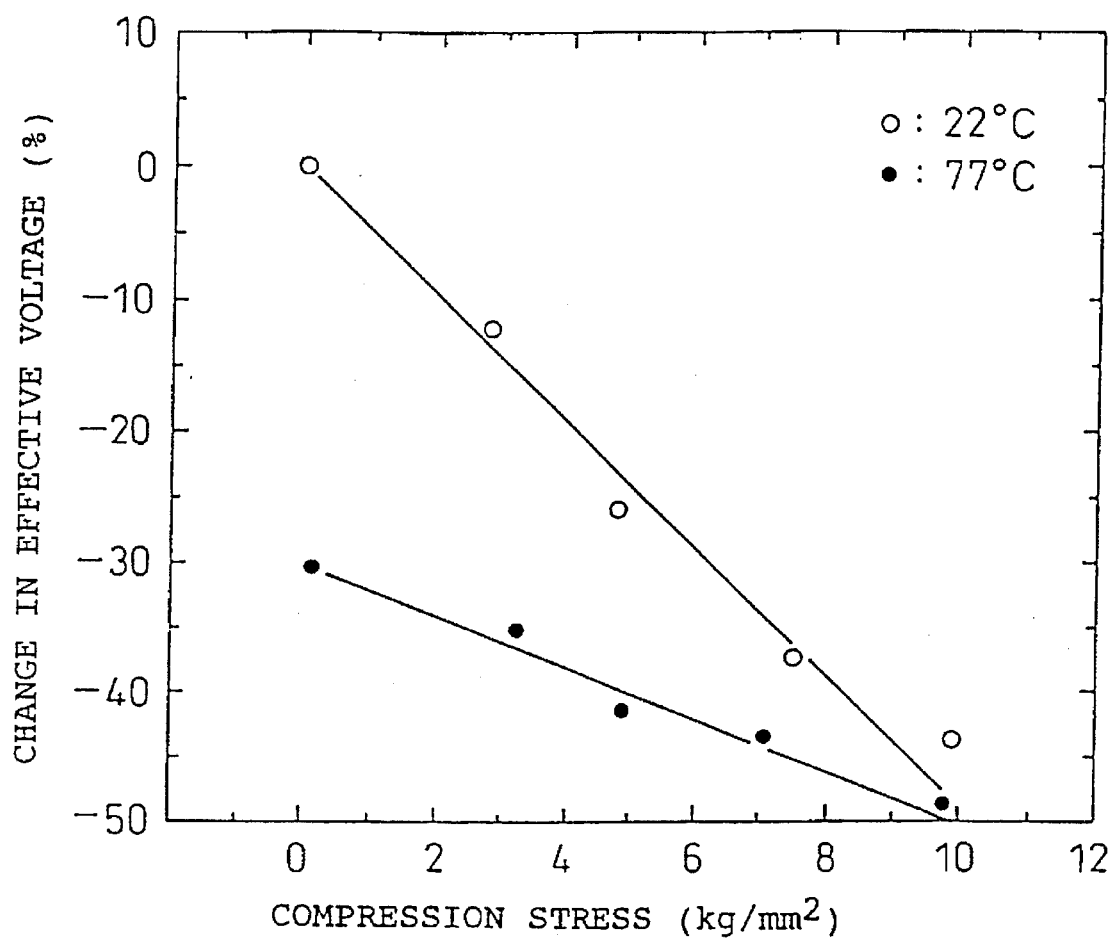
FIG. 3 is a graph showing the compression stress dependence of Barkhausen signals in a comparative material (a material tempered at 500° C.).
Figure 4:
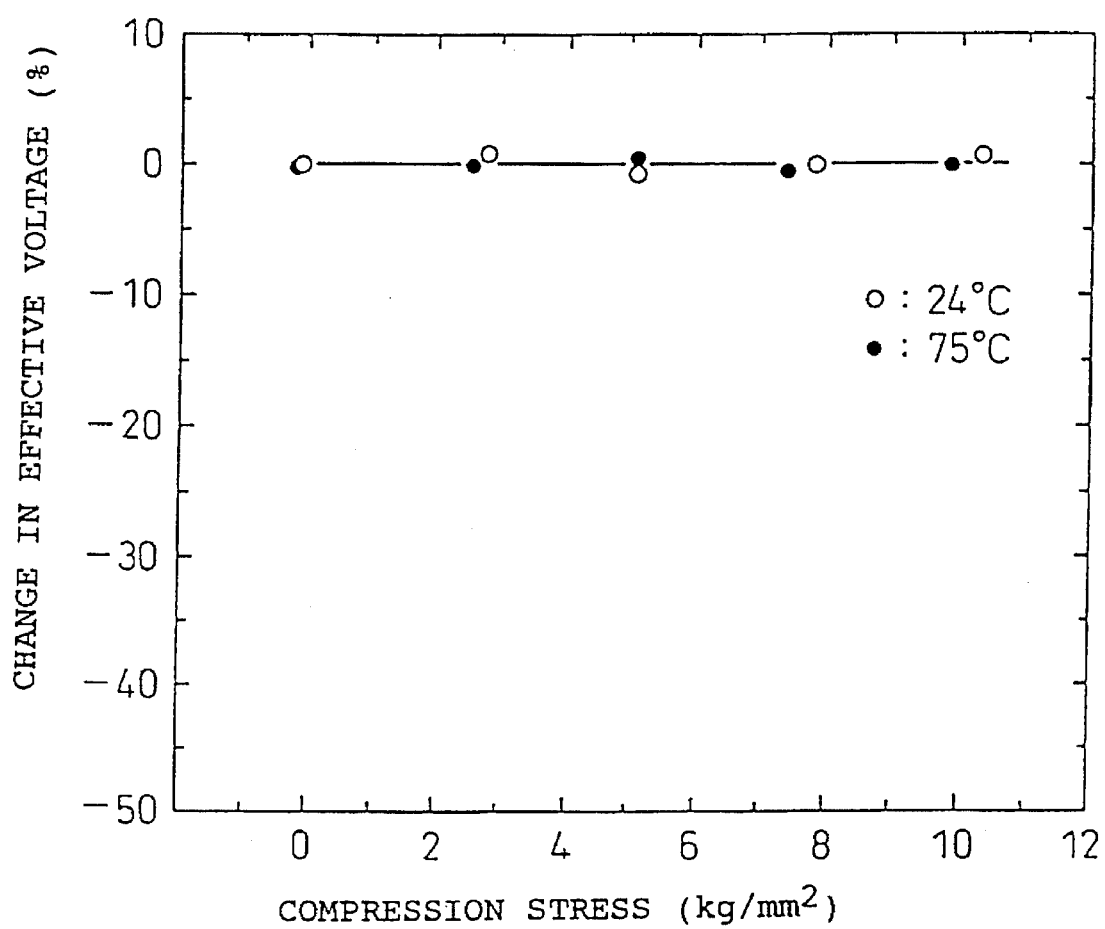
FIG. 4 is a graph showing the compression stress dependence of Barkhausen signals in another comparative material (a material gradually cooled from 900° C.)

The compression stress dependence of Barkhausen signals for the material tempered at 700° C., the material tempered at 500° C., and the material, which has been gradually cooled from 900° C., are shown in FIGS. 2, 3, and 4. As shown in FIG. 2, for the stress sensor of the present invention (tempered at 700° C.), the effective voltage of the Barkhausen signal was linearly correlated with the stress, and the linear correlation was not changed even when the measuring temperature was raised from 26° to 76° C. On the other hand, as shown in FIG. 3, for the sample tempered at 500° C., although the correlation between the effective voltage of the Barkhausen signal and the stress was linear, raising the temperature resulted in a change in the correlation. For the sample which had been gradually cooled from 900° C., as shown in FIG. 4, the sensitivity of the Barkhausen signal to the stress was remarkably small.

From the above results, it was found that, for the stress sensor of the present invention, the stress dependence of the Barkhausen signal is linear and, further, the stress dependence is not influenced by the temperature, rendering the stress sensor of the present invention suitable as a stress sensor for practical use.

EXAMPLE 3

A stress sensor was attached to a steel product, and the steel product was pulled by means of a tensile tester. In this state, Barkhausen signals were measured to determine the relationship between the Barkhausen signal and the tensile stress. In this case, the material under test and the temperature were varied to determine the influence thereof.

One steel sheet of 45 mm×20 mm×2 mm was taken from a carbon steel product having a C content of 0.3% by weight. The steel sheet was annealed for one hr in Ar gas at 950° C., a temperature falling within a temperature region where the γ phase is present, and then quenched by water cooling. Subsequently, the steel sheet was tempered at 650° C., a temperature below the temperature region where the γ phase is present, for 3 hr and cooled at rate of 10° C./min. Observation of the texture revealed that the above steel material fell within the scope of the present invention, that is, granular cementites were precipitated in the interior of ferrite grains and had an average grain diameter of 1.26 μm and a standard deviation in the grain size distribution of 0.46 μm.

Each sheet sample was welded to a square steel product of 60 mm×60 mm×1000 mm by an arc discharge welding process. In this case, the sample was welded to the side of the steel product so that the longitudinal direction of the sample conformed to that of the steel product. Tensile stress was applied to the longitudinal direction of the steel product to determine the relationship between the tensile stress and the Barkhausen signal. In this case, the steel product was heated by a heater to determine the temperature dependence of the above relationship. A magnetic head and a signal analyzing system used were the same as those of Example 1, and Barkhausen signals having frequencies ranging from 1 to 5 kHz were detected. In this case, the direction of excitation was allowed to conform to that of stress.

Figure 5:
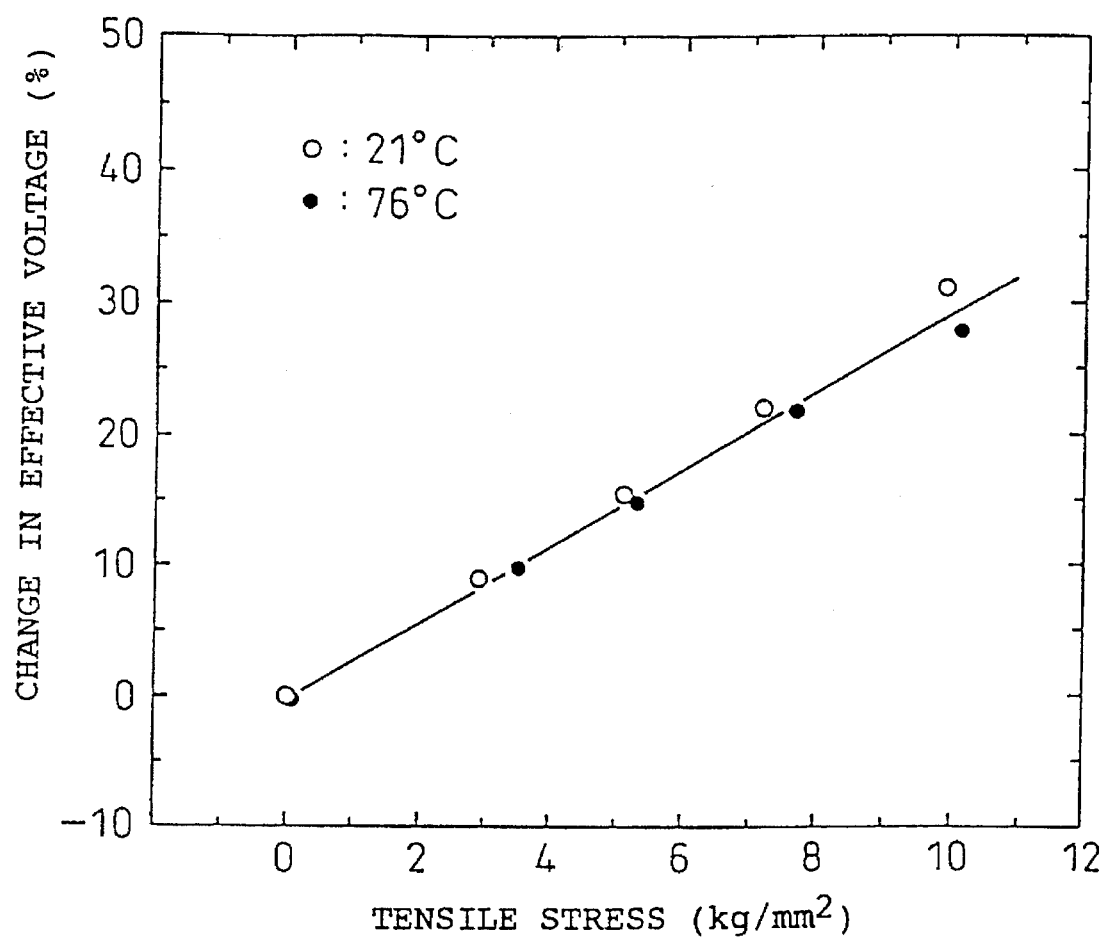
FIG. 5 is a graph showing the tensile stress dependence of Barkhausen signals for a stress sensor according to one embodiment of the present invention.

The results of investigation on the tensile stress dependence of Barkhausen signals with varied measuring temperature are shown in FIG. 5. As can be seen from FIG. 5, the effective voltage of the Barkhausen signal increased with increasing the tensile stress and was linearly correlated with the tensile stress, and the linear correlation remained unchanged even when the measuring temperature was raised from 21° to 76° C.

From the above results, it is apparent that the use of the stress sensor of the present invention enables the tensile stress to be measured with good accuracy and independently of the temperature.

EXAMPLE 4

The temperature dependence of Barkhausen signals was investigated using samples with varied C content. Square bars of 5 mm×5 mm×50 mm were taken from steel products having C contents specified in Table 3, annealed for one hr in Ar gas at 900° to 1000° C., temperatures falling within a temperature region where the γ phase is present, and then quenched by water cooling. Subsequently, the square bars were tempered at temperatures (500° to 710° C.) below the temperature region where the γ phase is present, for 3 hr and cooled at a rate of 10° C./min.

Barkhausen signals were measured while controlling the temperature of the samples in a thermostatic chamber. The same magnetic head and signal analyzing system as used in Example 1 were used for the detection of Barkhausen signals. Table 3 shows the results of observation of the texture for each sample and the percentage variation in signal caused when the temperature was changed from −10° C. to 80° C.

TABLE 3

| No. | C content, wt % | Tempering temp. | Grain diameter of cementite, μm | | Signal variation due to temp. change, % | Remarks |
| --- | --- | --- | --- | --- | --- | --- |
| | | | Avg. grain dia. | Standard deviation | | |
| 1 | <0.01 | — | — | — | 31 | Comp. Ex. |
| 2 | 0.1 | 500 | 0.30 | 0.10 | 33 | Comp. Ex. |
| 3 | 0.3 | 500 | 0.38 | 0.11 | 34 | Comp. Ex. |
| 4 | 0.6 | 500 | 0.42 | 0.12 | 35 | Comp. Ex. |
| 5 | 1.2 | 500 | 0.43 | 0.11 | 32 | Comp. Ex. |
| 6 | 1.8 | 500 | 0.45 | 0.12 | 35 | Comp. Ex. |
| 7 | 0.1 | 650 | 1.14 | 0.36 | 1.8 | Ex. of inv. |
| 8 | 0.3 | 650 | 1.23 | 0.48 | 1.6 | Ex. of inv. |
| 9 | 0.6 | 690 | 0.85 | 0.45 | 1.2 | Ex. of inv. |
| 10 | 1.2 | 700 | 0.85 | 0.62 | 1.0 | Ex. of inv. |
| 11 | 1.8 | 710 | 0.92 | 0.75 | 0.9 | Ex. of inv. |

It was found that when the C content was less than 0.01% by weight, no cementite was precipitated within the structure and a change in signals by the compression stress was saturated by a stress of about 3 kg/mm². For the sample Nos. 2 to 6, although granular cementites were precipitated in the interior of ferrite grains, the standard deviation of the grain size distribution was less than 0.14 μm. Further, in these samples, a change in Barkhausen signals by the temperature change is large. For the sample Nos. 7 to 11, the textures fell within the scope of the present invention, and a change in Barkhausen signals by temperature change was much smaller than that for the sample Nos. 2 to 6.

From the above results, it is apparent that, for the stress sensor of the present invention, Barkhausen signals are less likely to be influenced by the temperature, enabling the compression stress to be measured with good accuracy.

EXAMPLE 5

A high-carbon high-chromium steel product comprising 1.0% by weight of C, 0.28% by weight of Si, 0.41% by weight of Mn, and 1.50% by weight of Cr was used to investigate the temperature dependence of Barkhausen signals.

A square bar of 5 mm×5 mm×50 mm was taken from the steel product, heated in Ar gas to 800° C., and then furnace cooled to precipitate granular carbides in the interior of ferrite grains. Structural analysis has revealed that the precipitated carbide comprised an $Fe_3C$ compound with Cr dissolved therein in a solid solution form. Further, observation of the texture has revealed that the granular carbide had an average grain diameter of 1.3 μm and the standard deviation of the grain size distribution was 0.5 μm. Therefore, it was confirmed that this sample had a texture falling within the scope of the present invention.

Barkhausen signals were measured while controlling the temperature of the sample in a thermostatic chamber. The same magnetic head and signal analyzing system as used in Example 1 were used for the detection of Barkhausen signals. As a result, it was confirmed that the percentage signal variation in Barkhausen signals by a change in temperature from −10° C. to 80° C. was 1.5%, substantiating that satisfactory accuracy could be ensured even when the temperature was changed.

The same experiments were carried out for steel products containing other elements, i.e., Al, B, Co, Mo, Nb, Ni, Sn, Ta, Ti, U, V, and W. From the experimental results, it was found that, for the samples falling within the scope of the present invention, wherein granular carbides have been precipitated, the Barkhausen signal is not affected by the temperature.

EXAMPLE 6

A stainless steel product comprising 0.09% by weight of C, 0.50% by weight of Si, 0.48% by weight of Mn, 12.3% by weight of Cr, and 0.17% by weight of Al was used to investigate the temperature dependence of Barkhausen signals. The steel product was forged, and a square bar of 5 mm×5 mm×50 mm was removed, heated in Ar gas to 800° C., and then furnace cooled to precipitate a granular carbide in the interior of ferrite grains. X-ray diffraction analysis has revealed that the carbide was $(Cr, Fe)_{23}C_6$. The carbide had an average grain diameter of 0.4 μm and the standard deviation of the grain size distribution was 0.4 μm.

Barkhausen signals were measured while controlling the temperature of the sample in a thermostatic chamber. The same magnetic head and signal analyzing system as used in Example 1 were used for the detection of Barkhausen signals. As a result, it was confirmed that the percentage signal variation in Barkhausen signals by a change in temperature from −10° C. to 80° C. was 1.1%, substantiating that satisfactory accuracy could be ensured even when the temperature was changed.

Thus, it was found that, even when the carbide is chromium carbide, the Barkhausen signal is not dependent upon the temperature when the grain size falls within the scope of the present invention. Further experiments were carried out for samples prepared using other steel products wherein, besides chromium carbide, granular carbides of molybdenum carbide, niobium carbide, titanium carbide, vanadium carbide, tungsten carbide, and zirconium carbide had been precipitated. In these experiments as well, stress sensors having excellent temperature characteristics could be obtained when the grain size fell within the scope of the present invention.

From the above results, it is apparent that the use of the stress sensor of the present invention enables the stress created in an object to be measured independently of measuring temperatures. Therefore, when a calibration curve is previously prepared for the stress sensor of the present invention, the stress can be measured independently of the measured object. Further, since the calibration curve is independent of the temperature, there is no need to prepare a calibration curve for the temperature, eliminating the need to prepare a large amount of data for a calibration curve and, at the same time, significantly shortening the time taken for the measurement.

We claim:

1. A stress sensor, which, in use, is attached to a measured object and generates Barkhausen signals, for measuring a stress created in the object, characterized in that the stress sensor is formed of a steel material having such a texture that a granular carbide consisting essentially of: element M wherein M represents at least one element selected from a group consisting of Fe, Al, B, Co, Cr, Mn, Mo, Nb, Ni, Si, Sn, Ti, U, V, W, and Zr; C; and unavoidable impurities has been precipitated in the interior of ferrite grains; and the granular carbide has an average grain diameter of 0.05 to 1.0 µm and a standard deviation in grain size distribution of 0.14 to 2.0 µm, whereby superior temperature characteristics of Barkhausen signals generated from the stress sensor can be obtained.

2. A stress sensor, which, in use, is attached to a measured object and generates Barkhausen signals, for measuring a stress created in the object, characterized in that the stress sensor is formed of a steel material having such a texture that a granular carbide consisting essentially of: element M wherein M represents at least one element selected from a group consisting of Fe, Al, B, Co, Cr, Mn, Mo, Nb, Ni, Si, Sn, Ti, U, V, W, and Zr; C; and unavoidable impurities has been precipitated in the interior of ferrite grains; and the granular carbide has an average grain diameter of between more than 1.0 to 3.0 µm, whereby superior temperature characteristics of Barkhausen signals generated from the stress sensor can be obtained.

3. The stress sensor according to claim 1 characterized in that the carbide is at least one compound selected from a group consisting of $MC_2$, MC, $M_2C$, $M_7C_3$, $M_3C$, $M_{23}C_6$, and $M_6C$ compounds.

4. The stress sensor according to claim 1 characterized in that the carbide is an $M_3C$ compound.

5. The stress sensor according to claim 2 characterized in that the carbide is at least one compound selected from a group consisting of $MC_2$, MC, $M_2C$, $M_7C_3$, $M_3C$, $M_{23}C_6$, and $M_6C$ compounds.

6. The stress sensor according to claim 2 characterized in that the carbide is an $M_3C$ compound.

7. A stress sensor, which, in use, is attached to an object to be measured and generates Barkhausen signals, for measuring a stress created in the object,. characterized in that the stress sensor is formed of a steel material having such a texture that a granular carbide consisting essentially of: element M wherein M represents at least one element selected from a group consisting of Fe, Al, B, Co, Cr, Mn, Mo, Nb, Ni, Si, Sn, Ti, U, V, W, and Zr; C; and unavoidable impurities, and having the granular carbide consisting essentially of at least one compound selected from a group consisting of $MC_22$, MC, $M_xC$, $M_7C_3$, $M_3C$, $M_{23}C_6$, and $M_6C$ compounds with an average grain diameter of 0.05 to 1.0 µm and a standard deviation in grain size distribution of 0.14 to 2.0 µm, has been precipitated in the interior of ferrite grains, whereby excellent temperature characteristics of Barkhausen signals generated from the stress sensor can be obtained.

8. The stress sensor according to claim 7, characterized in that the granular carbide is an $M_3C$ compound.

9. A stress sensor, which, in use, is attached to a measured object and generates Barkhausen signals, for measuring a stress created in the object, characterized in that the stress sensor is formed of a steel material having such a texture that a granular carbide consisting essentially of: element M wherein M represents at least one element selected from a group consisting of Fe, Al, B, Co, Cr, Mn, Mo, Nb, Ni, Si, Sn, Ti, U, V, W, and Zr; C; and unavoidable impurities has been precipitated in the interior of ferrite grains, and the granular carbide consists essentially of an $M_3C$ compound with an average grain diameter of 0.05 to 1.0 µm and a standard deviation in grain size distribution of 0.14 to 2.0 µm, whereby excellent temperature characteristics of Barkhausen signals generated from the stress sensor can be obtained.

10. The stress sensor according to claim 1, wherein the change in effective voltage of the Barkhausen signal generated by the stress sensor at a temperature above 28° C. and below 88° C. is less than 9.5%.

11. The stress sensor according to claim 2, wherein the change in effective voltage of the Barkhausen signal generated by the stress sensor at a temperature above 28° C. and below 88° C. is less than 9.5%.

12. The stress sensor according to claim 7, wherein the change in effective voltage of the Barkhausen signal generated by the stress sensor at a temperature above 28° C. and below 88° C. is less than 9.5%.

13. The stress sensor according to claim 9, wherein the change in effective voltage of the Barkhausen signal generated by the stress sensor at a temperature above 28° C. and below 88° C. is less than 9.5%.

* * * * *

UNITED STATES PATENT AND TRADEMARK OFFICE
CERTIFICATE OF CORRECTION

PATENT NO. : 5,652,394
DATED : July 29, 1997
INVENTOR(S) : Kazuo SUGINO, et al.

It is certified that error appears in the above-indentified patent and that said Letters Patent is hereby corrected as shown below:

Column 3, line 2, change "C; and" to --C and-- and change "has" to --have--.

Column 4, line 32, change "C; and" to --C and--.

Column 6, line 57, change "a" to --an--.

Column 11, line 13, change "independently" to --independent--.

Column 11, line 26, change "C; and" to --C and--. and "has" to --have--.

Column 11, line 40, change "C; and" to --C and--. and "has" to --have--.

Column 12, line 13, change "$MC_22$," to --$MC_2$,-- and "$M_zC$," to --$M_2C$,--.

UNITED STATES PATENT AND TRADEMARK OFFICE
CERTIFICATE OF CORRECTION

PATENT NO. : 5,652,394
DATED : July 29, 1997
INVENTOR(S) : Kazuo SUGINO, et al.

It is certified that error appears in the above-indentified patent and that said Letters Patent is hereby corrected as shown below:

Column 12, line 11, after "impurities" insert --have been precipitated in the interior of ferrite grains,--.

Column 12, line 16, delete "has been precipitated in the interior of ferrite".

Column 12, line 17, delete "grains,".

Signed and Sealed this

Twenty-seventh Day of October, 1998

Attest:

BRUCE LEHMAN

Attesting Officer

Commissioner of Patents and Trademarks